(12) United States Patent
Ishiguro et al.

(10) Patent No.: US 6,322,453 B1
(45) Date of Patent: Nov. 27, 2001

(54) CONSTANT VELOCITY UNIVERSAL JOINT

(75) Inventors: Shigeyoshi Ishiguro; Kenji Terada; Yoshimasa Ushioda; Akio Sakaguchi; Hisaaki Kura; Katsuhiro Suzuki; Masaru Komatsu, all of Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/431,228

(22) Filed: Nov. 1, 1999

(30) Foreign Application Priority Data

Nov. 2, 1998 (JP) ................................. 10-312321
Dec. 18, 1998 (JP) ................................. 10-361062

(51) Int. Cl.$^7$ ....................................... F16D 3/205
(52) U.S. Cl. ...................... 464/111; 464/124; 464/132; 464/905
(58) Field of Search ........................ 464/111, 112, 464/120, 122, 123, 124, 132, 905

(56) References Cited

U.S. PATENT DOCUMENTS

| 5,380,249 | * | 1/1995 | Krude ................................. | 464/111 |
| 5,391,013 | * | 2/1995 | Ricks et al. ......................... | 464/111 |
| 5,507,693 | * | 4/1996 | Scharzler et al. ................... | 464/111 |
| 5,788,577 | * | 8/1998 | Kadota et al. ...................... | 464/111 |
| 5,836,822 | * | 11/1998 | Kudo et al. ......................... | 464/111 |
| 5,989,124 | * | 11/1999 | Goto et al. .......................... | 464/111 |

FOREIGN PATENT DOCUMENTS

| 4343096C1 | 7/1995 | (DE) . |
| 2195167A | 3/1988 | (GB) . |
| 2226102A | 6/1990 | (GB) . |
| 2259557A | 3/1993 | (GB) . |
| 2324354A | 10/1998 | (GB) . |

* cited by examiner

*Primary Examiner*—Lynne H. Browne
*Assistant Examiner*—Kenn Thompson
(74) *Attorney, Agent, or Firm*—Arent Fox Kintner Plotkin & Kahn

(57) ABSTRACT

A perpendicular distance (PCR1) between a centerline (L1) including the center (O3) of the outer circumference surface (4b) of an outer roller (4), orthogonal to axis Z of a trunnion (2a) and a joint center O is shifted by Δh (=PCR1−PCR2) from a perpendicular distance (PCR2) between a centerline (L2) including the center (O1) of the outer circumference surface (3b) of an inner roller (3), orthogonal to axis Z of a trunnion (2a) and a joint center O. Under the most favorable conditions, PCR2 is shifted by an optimal amount of ΔH from PCR1 toward the proximal end of the trunnion, and the position of contact (S) between the inner circumference surface (4a) of the outer roller 4 and the outer circumference surface (3b) of the inner roller (3) is located on the centerline (L1) (on PCR1) of the outer circumference surface (4b) of the outer roller (4).

21 Claims, 10 Drawing Sheets

FIG. 5a (PRIOR ART)
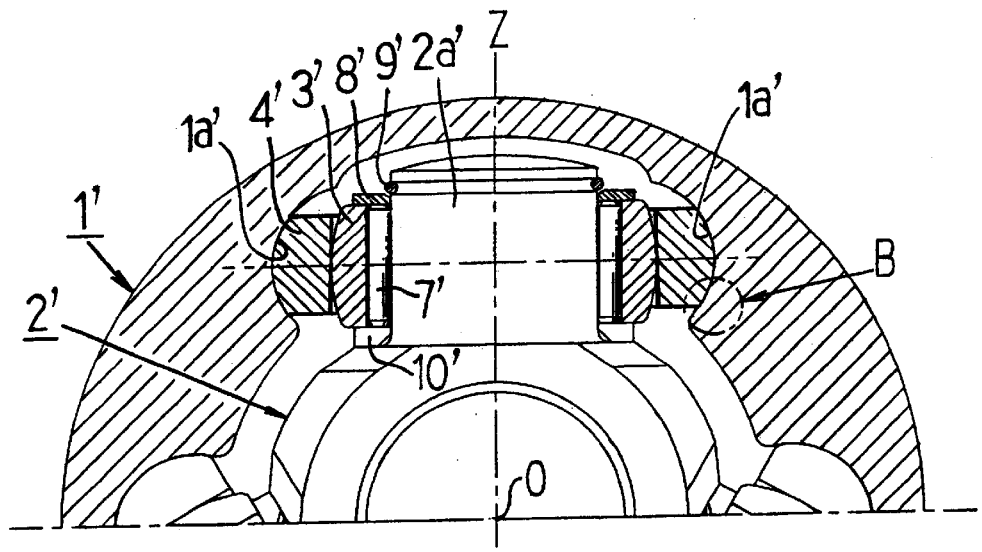
FIG. 5b (PRIOR ART)
FIG. 5c (PRIOR ART)
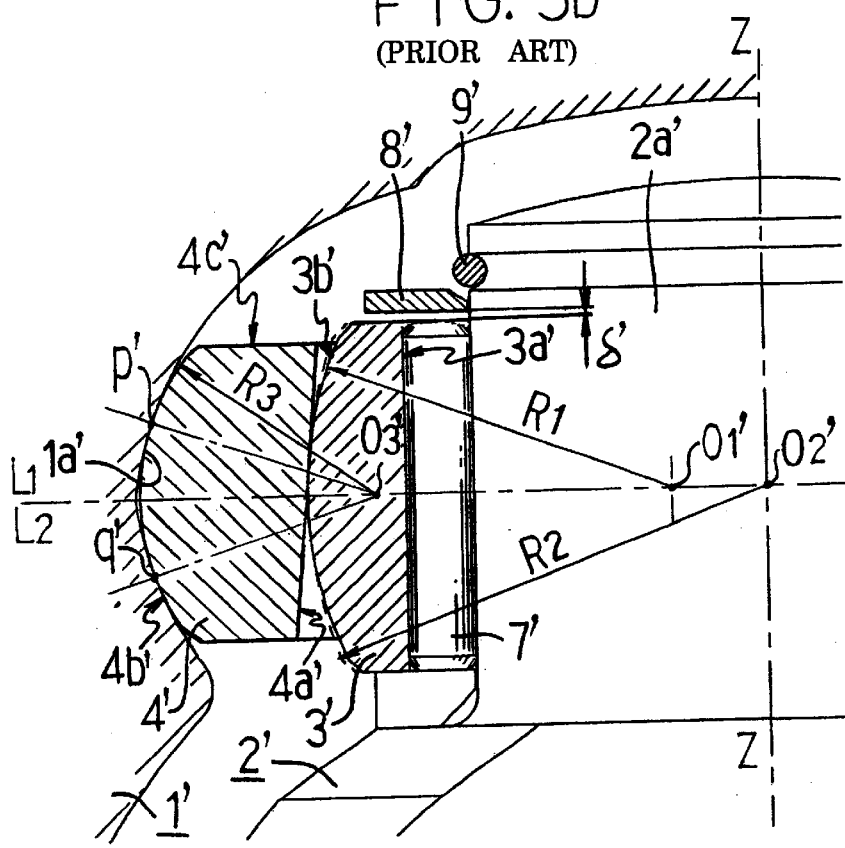
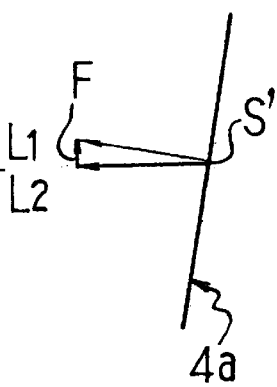

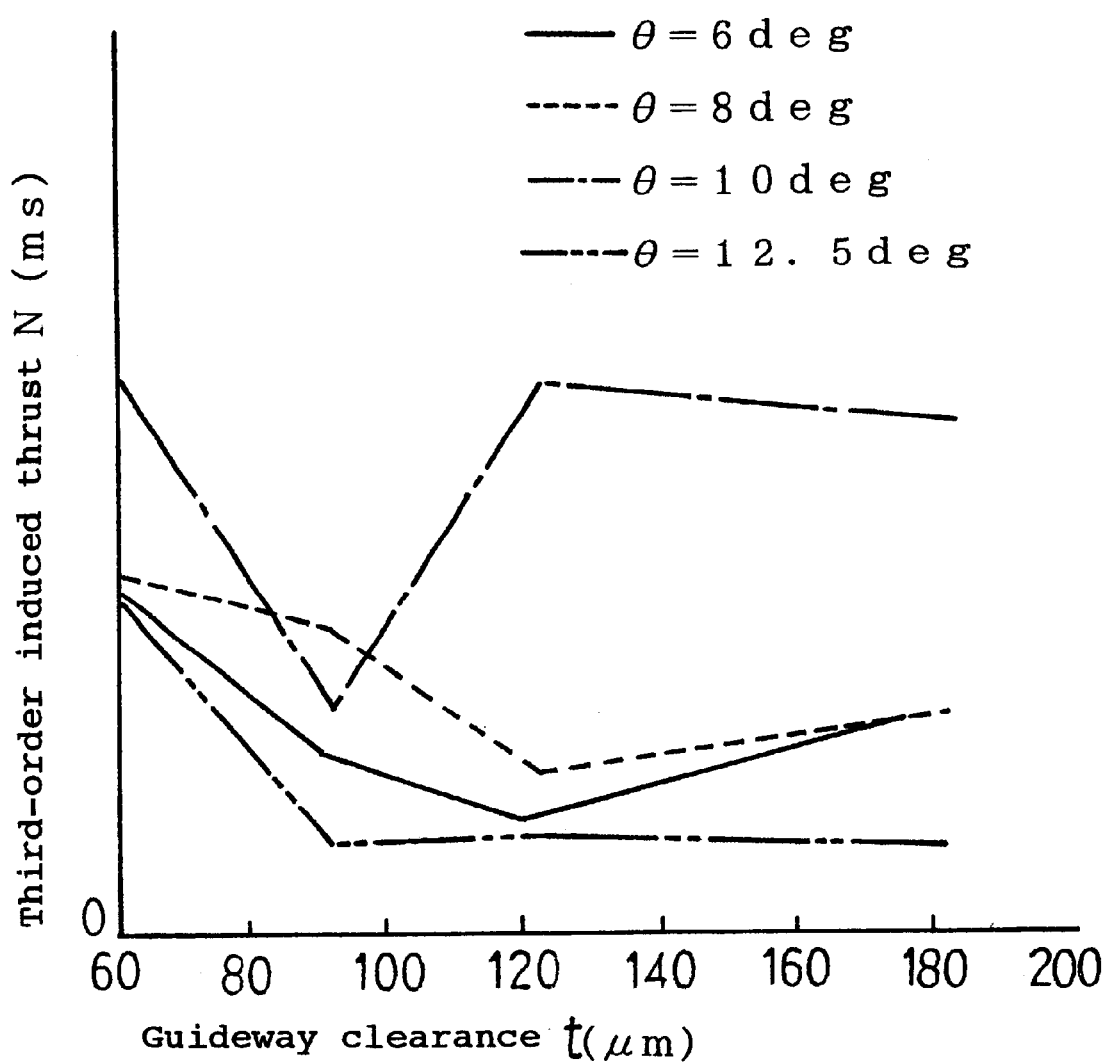

CONSTANT VELOCITY UNIVERSAL JOINT

BACKGROUND OF THE INVENTION

The present invention relates to a constant velocity universal joint for use in a power transmission of automobiles or various types of industrial machines and, more particularly, to a tripod type constant velocity universal joint.

As a tripod type constant velocity universal joint, for example, known is the one with a configuration shown in FIGS. 6 and 7. The constant velocity universal joint comprises an outer joint member 21 having three axial track grooves 22 formed in the inner circumference portion thereof and having respective axial roller guideways 22a on both sides of each of the track grooves 22, and a tripod member 24 having three radially protruding trunnions 25, said tripod member 24 rotatably mounting a roller 20 to a cylindrical outer circumference surface of each of the trunnions 25 via needle rollers 26 respectively. Each roller 20 is accommodated in and mated with the roller guideways 22a of each of the track grooves 22 of the outer joint member 21 respectively. Each of the rollers 20 rolls on the roller guideways 22a while rotating about the center of axis of each of the trunnions 25, thereby smoothly guiding relative axial displacement and angular displacement between the outer joint member 21 and the tripod member 24. Simultaneously, smoothly guided is an axial displacement of each of trunnions 25, with respect to the roller guideways 22a, accompanying a change in the rotational phase during the transmission of rotational torque between the outer joint member 21 and the tripod member 24 at a predetermined operating angle.

In practice, however, as shown in FIGS. 8 and 9, when the outer joint member 21 and the tripod member 24 transmit rotational torque while taking at an operating angle θ, as the trunnions 25 being inclined, each of the rollers 20 and the roller guideways 22a are angularly disposed. Consequently, this prevents smooth rolling of each of the rollers 20. That is, the roller 20 is to rotate in the direction shown with the arrow a (about the axis of the trunnion 25) in FIG. 8. On the other hand, since the roller guideway 22a has an arcuate cross section and extends in parallel to the axis of the outer joint member 21, the roller 20 is to roll to move axially on the roller guideway 22a in such a manner as to gauge the same. Accordingly, sliding occurs at the contact portion between the outer circumference surface of the roller 20 and the roller guideway 22a to cause frictional resistance (sliding resistance) to increase, contributing to an increase in the induced thrust. The induced thrust contributes to inducing vibration at the joint portion. For example, in the power transmission of an automobile, there is such a problem that a large amount of induced thrust at the joint portion provides discomfort to passengers. This is because the thrust is transmitted to the automobile body via the power transmission path and is amplified, and produces resonance with the vibration of the automobile body, thus resulting in increased noise.

In view of the foregoing circumstances, in order to eliminate the angular disposition between a roller and a roller guideway and hereby reduce the induced thrust, a constant velocity universal joint with a configuration shown in FIGS. 10 and 11 has been proposed (Japanese Patent Publication No.Hei 3 (1991) -1529, etc.). This has contributed to reducing vibration and noise. This constant velocity universal joint has a roller which is mounted to the trunnion 25 of the tripod member 24, said roller comprising two types of rollers of an outer roller 23 and an inner roller 27. This allows an inclination between the outer roller 23 and the trunnion 25 (and also inner roller 27) (an inclination mechanism). The outer roller 23 is in contact with and rolls on the roller guideways 22a. The inner roller 27 has a spherical outer circumference surface 27b to engage the cylindrical inner circumference surface 23a of the outer roller 23. The inner circumference surface of the inner roller 27 engages the cylindrical outer circumference surface of the trunnion 25 via the needle rollers 26.

As shown in FIG. 12, when the outer joint member 21 and the tripod member 24 transmit rotational torque while taking an operating angle θ, the inner roller 27 is inclined with respect to the roller guideways 22a as the trunnion 25 inclines. However, the outer roller 23 is allowed an inclination with respect to the trunnion 25 and the inner roller 27, thereby allowed for maintaining parallel attitude with respect to and rolling on the roller guideways 22a. Consequently, smooth rolling of the outer roller 23 is ensured, the sliding resistance with the roller guideways 22a is reduced, thus the induced thrust is suppressed.

As described in the foregoing, the constant velocity universal joint shown in FIGS. 10 and 11 has reduced induced thrust compared with conventional joints, however, there was a limit in further reducing the induced thrust. As the reason for this, the attitude of the outer roller is believed to be unstable with respect to the roller guideway although the constant velocity universal joint shown in FIGS. 10 and 11 can maintain the parallel attitude of the outer roller to some extent by the inclination mechanism. This instability may be caused by a slight inclination of the outer roller in the longitudinal sectional direction of the outer joint member (the sectional direction including the axis of the outer joint member). Alternatively, a slight inclination of the outer roller in the cross sectional direction of the outer joint member (the sectional direction perpendicular to the axis of the outer joint member) may cause the instability. The inclinations may be resulted from the effect of the frictional force at the contact portion of the outer and inner roller or the imbalance of joint loading acting on the contact portions of the outer and inner roller, and on those of the outer roller and the roller guideways.

Based on the foregoing circumstances, the applicant had already filed a patent application for a constant velocity universal joint with a configuration exemplified in FIG. 5 in order to further reduce the induced thrust (Japanese Patent Laid-Open Publication No.Hei 9 (1997) -14280). In the drawing, an inner roller 3' fits rotatably over the outer circumference of a trunnion 2a' of a tripod member 2' via a plurality of needle rollers 7'. Movement of the inner roller 3' in the direction of axis Z of the trunnion 2a' is limited by means of a retainer ring 8' (and a snap ring 9') attached to the distal end of the trunnion 2a' and a washer 10' attached to the proximal end of the trunnion 2a'. In fact, there is a slight axial clearance δ' between the needle roller 7' and the inner roller 3', and between the retainer ring 8' and washer 10' (the clearance δ' is made far larger than actually is for purposes of illustration). The inner circumference surface 3a' of the inner roller 3' is a cylindrically shaped one and the outer circumference surface 3b' is a spherically shaped convex one. The generating line of the outer circumference surface 3b' is a circular arc of a radius of R1 with the center thereof at point O1' which is shifted outward by a predetermined amount from the center of radius O2' of the inner roller 3'.

The outer roller 4' fits rotatably over the outer circumference surface 3b' of the inner roller 3'. In the example shown in the figure, the inner circumference surface 4a' of the outer roller 4' has a conical shape whose diameter decreases toward the distal end of the trunnion 2a'. The angle of inclination α' of the inner circumference surface 4a' (see FIG. 4) takes a small value, for example, on the order of 0.1° to 3°, however, the degree of inclination is fairly exaggerated in the drawing. The generating line of an outer circumference surface 4b' is a circular arc of a radius of R3 with the center thereof at point O3'. The outer circumference surface 4b' is in angular contact with a roller guideway 1a' of an outer joint member 1' at two points, p' and q'. Centerline L1 which includes the center O3' of the outer circumference surface 4b' of the outer roller 4' and which is orthogonal to the axis Z of the trunnion 2a' is designed to be coincident with centerline L2. The centerline L2 includes the center O1' of the outer circumference surface 3b' of the inner roller 3' and is orthogonal to the axis Z of the trunnion 2a'.

As shown in FIG. 4, the inner circumference surface 4a' of the outer roller 4' has a conical shape whose diameter gradually decreases toward the distal end of the trunnion (upward in the figure). This causes a loading component force F to be generated toward the distal end of the trunnion at the contact position S' between the surface 4a' and the outer circumference surface 3b' of the inner roller 3'. The loading component force F acts in such a manner as to push the outer roller 4' up toward the distal end of the trunnion, reducing the contact pressure at portion B (see FIG. 5(a)) of the roller guideway 1a' on the non-loading side. In addition, a force F' is generated toward the proximal end of the trunnion (downward in the figure) as a reactive force against the loading component force F at the contact position S'. The reactive force F' acts in such a manner as to push the inner roller 3' down toward the proximal end of the trunnion, suppressing the axial movement of the inner roller 3' and needle rollers 7' with respect to the trunnion 2a'. As shown in FIG. 5(b), this allows the inner roller 3' and needle rollers 7' to be always pushed against the washer 10' on the lower side, thus suppressing a variation in the contact position S' resulting from the axial clearance δ'.

The constant velocity universal joint with the aforementioned configuration contributes to further reducing the induced thrust resulting from the decrease in contact pressure at portion B of the roller guideway 1a' on the non-loading side in conjunction with the stability at the contact position S'. However, on the course of many experiments, the induced thrust was found to exceed a target value in some test samples. The cause of the excess has not yet been clarified, however, may be concluded as follows.

That is, when the joint transmits rotational torque while taking an operating angle, accompanying a phase change in the rotational direction of the trunnion 2a', the contact position S' is to move reciprocally within a predetermined region from a reference point at which the operating angle is 0° (the position shown in FIG. 4) toward the proximal end of the trunnion (downward in the figure) and toward the distal end of the trunnion (upward in the figure) where the amount of movement from a position of an operating angle of 0° toward the proximal end of the trunnion is greater than that toward the distal end of the trunnion. However, in the constant velocity universal joint with the aforementioned configuration, the contact position S' at an operating angle of 0° is shifted by ΔH' toward the distal end of the trunnion (upward in the figure) from the center line L1 (which divides the distance between angular contact points p' and q' into equal parts) of the outer circumference surface 4b' of the outer roller 4'. This results from a geometrical relationship since the inner circumference surface 4a' of the outer roller 4' has an angle of inclination α', but ΔH' is actually very small, unlike shown in the figure, since the angle of inclination α' is very small. In addition, the loading component force F occurs toward the distal end of the trunnion at the contact position S'. Therefore, the joint loading is localized at the contact point p' on the distal end of the trunnion when the joint rotates taking an operating angle θ and thus a variation in the loading balance is generated between the contact points p' and q'. The variation in the loading balance between the contact points p' and q' causes the inclination (drift) of the outer roller 4' to increase, which is considered to contribute to increasing the induced thrust.

Furthermore, in a constant velocity universal joint of this type, the guideway clearance between the outer circumference surface of the outer roller and the roller guideway is generally made as small as possible to reduce the backlash of the joint. Thus, a slight inclination of the outer roller 4' causes the roller guideway 1a' on the non-loading side to be in comparatively strong contact with the outer circumference surface 4b' of the outer roller 4'. This is considered to result in a comparatively high contact pressure at the roller guideway 1a, on the loading side. As such, the relationship between the degree of inclination of the outer roller with respect to the roller guideway and the clearance of the guideway causes the surface pressure of the contact portion of the both to increase, the sliding resistance to increase, and the smooth rolling of the outer roller to be interfered. This is considered to contribute to increasing the induced thrust.

SUMMARY OF THE INVENTION

An object of the present invention is to provide a constant velocity universal joint formed in a shape in which the inner circumference surface of an outer roller generates a loading component force toward the distal end of the trunnion at the position in contact with the outer circumference surface of an inner roller, the constant velocity universal joint eliminating the aforementioned problems by controlling optimally the position of contact between the outer roller and the inner roller, and with further reduced induced thrust and thereby reduced vibration.

Another object of the present invention is to provide a constant velocity universal joint with the induced thrust further efficiently reduced and vibration hereby reduced by controlling optimally the guideway clearance between the roller guideway and the outer circumference surface of the outer roller.

In order to achieve the foregoing objects, the present invention provides a constant velocity universal joint which comprise an outer joint member having three axial track grooves formed in an inner portion thereof and having respective axial roller guideways on both sides of each of the track grooves, and a tripod member having three radially protruding trunnions to each of which an inner roller and an outer roller are mounted rotatably, said outer roller having a spherical outer circumference surface to be guided by the roller guideway of the track groove and an inner circumference surface, said inner roller having a spherical outer circumference surface in line contact with the inner circumference surface of the outer roller, and said inner circumference surface of the outer roller so shaped as to generate a loading component force toward a distal end of the trunnion at a position in contact with the outer circumference surface of the inner roller, wherein said position of contact at an operating angle of 0° is adapted to be located on a centerline including the center of the outer circumference surface of the outer roller and being orthogonal to an axis of the trunnion.

Furthermore, the present invention provides a constant velocity universal joint which comprise an outer joint member having three axial track grooves formed in an inner portion thereof and having respective axial roller guideways on both sides of each of the track grooves, and a tripod member having three radially protruding trunnions to each of which an inner roller and an outer roller are mounted rotatably, said outer roller having a spherical outer circumference surface to be guided by the roller guideway of the track groove and an inner circumference surface, said inner roller having a spherical outer circumference surface in line contact with the inner circumference surface of the outer roller, and said inner circumference surface of the outer roller so shaped as to generate a loading component force toward a distal end of the trunnion at a position in contact with the outer circumference surface of the inner roller, wherein a difference $\Delta h$ (=PCR1−PCR2) between a perpendicular distance (PCR1) and a perpendicular distance (PCR2) at an operating angle of 0° is secured to be within a range of $-0.2$ mm$\leq \Delta h \leq 0.33$ mm, preferably within a range of $-0.1$ mm$\leq \Delta h \leq 0.3$ mm, and more preferably within a range of $-0.1$ mm$\leq \Delta h \leq 0.27$ mm, the perpendicular distance (PCR1) being defined between a centerline which includes the center of the outer circumference surface of said outer roller and is orthogonal to an axis of said trunnion and the joint center, that is a PCR of the track groove of the outer joint member, the perpendicular distance (PCR2) being defined between a centerline which includes the center of the outer circumference surface of said inner roller and is orthogonal to the axis of said trunnion and the joint center, that is a PCR of the apex of the outer circumference surface of the inner roller when the inner roller is pushed toward the proximal end of the trunnion by the outer roller.

In the foregoing configuration, various types of shape shown in Japanese Patent Laid-Open Publication No.Hei 9 (1997) -14280 may be employed as the shape of the inner circumference surface of the outer roller, which "generates a loading component force toward the distal end of the trunnion". That is, as the shape of the inner circumference surface of the outer roller, may be employed various types of shape such as a conical shape whose diameter gradually decreases toward the distal end of the trunnion, a spherically-shaped concave surface with a point displaced toward the proximal end of the trunnion with respect to the center of the generating line of the outer circumference surface of the inner roller as the center of the generating line (the contour of FIG. 3 in Japanese Patent Laid-Open Publication No.Hei 9 (1997) -14280), a spherically-shaped convex surface with a point displaced toward the distal end of the trunnion with respect to the center of the generating line of the outer circumference surface of the inner roller as the center of the generating line (the contour of FIG. 4 in Japanese Patent Laid-Open Publication No.Hei 9 (1997) -14280), a combined surface of a conically-tapered surface whose diameter decreases toward the distal end of the trunnion and a spherically-shaped convex surface (the contour of FIG. 5 in Japanese Patent Laid-Open Publication No.Hei 9 (1997) -14280, or a combined surface of a cylindrical surface and a spherically-shaped convex surface (the contour of FIG. 6 in Japanese Patent Laid-Open Publication No.Hei 9 (1997) -14280). However, from the viewpoint of simplifying manufacturing processes, the inner circumference surface of the outer roller may preferably take a form of a conical contour whose diameter decreases gradually toward the distal end of the trunnion.

Furthermore, in order to achieve the aforementioned objects, the present invention provides a constant velocity universal joint which comprises an outer joint member having three axial track grooves formed in an inner portion thereof and having respective axial roller guideways on both sides of each of the track grooves, and a tripod member having three radially protruding trunnions to each of which an roller is mounted rotatably, said roller having an outer circumference surface to be guided by the roller guideways of the track groove, wherein the guideway clearance between the roller guideway on the both sides of the track groove and the outer circumference surface of said roller is secured to a predetermined amount sufficient to reduce induced thrust.

Said roller may be comprised of an outer roller with an outer circumference surface to be guided by the roller guideway of the track groove and an inner roller with a spherical outer circumference surface in line contact with the inner circumference surface of the outer roller. In this case, the inner circumference surface of the outer roller may be preferably so shaped as to generate a loading component force toward the distal end of the trunnion at the position of contact with the outer circumference surface of the inner roller. Specifically, as the shape of the inner circumference surface of the outer roller, various types of shape shown in Japanese Patent Laid-Open Publication No.Hei 9 (1997) -14280 may be employed.

The outer circumference surface of the outer roller may be so constructed as to be in angular contact with the roller guideway at two points.

A desirable result is obtained when the magnitude, t, of the guideway clearance between the roller guideway and the outer roller is allowed to fall within a range of 0.080 mm$\leq t \leq 0.110$ mm.

Furthermore, desirable results are obtained when a difference $\Delta h$ (=PCR1−PCR2) between a perpendicular distance (PCR1) and a perpendicular distance (PCR2) at an operating angle of 0° is secured to be within a range of $-0.2$ mm$\leq \Delta h \leq 0.33$ mm, preferably within a range of $-0.1$ mm$\leq \Delta h \leq 0.3$ mm, and more preferably within a range of $-0.1$ mm$\leq \Delta h \leq 0.27$ mm, the perpendicular distance (PCR1) being defined between a centerline which includes the center of the outer circumference surface of said outer roller and is orthogonal to an axis of said trunnion and the joint center, the perpendicular distance (PCR2) being defined between a centerline which includes the center of the outer circumference surface of said inner roller and is orthogonal to the axis of said trunnion and the joint center.

The present invention can reduce the induced thrust in a better manner than one with the conventional configuration can when the joint transmits rotational torque at an operating angle. Accordingly, the constant velocity universal joint of the present invention provides improved vibration characteristics which can be used, for example, in a power transmission of an automobile to contribute to further reducing vibration and noise of the automobile body.

BRIEF DESCRIPTION OF THE DRAWINGS

FIGS. 5(a) and 5(b) are cross sectional views of a constant velocity universal joint according to a prior art.

FIG. 14 is a graph showing the relationship between the guideway clearance and the induced thrust.

DESCRIPTION OF THE PREFERRED EMBODIMENTS

The embodiments of the present invention will be explained hereinbelow.

Figure 3:
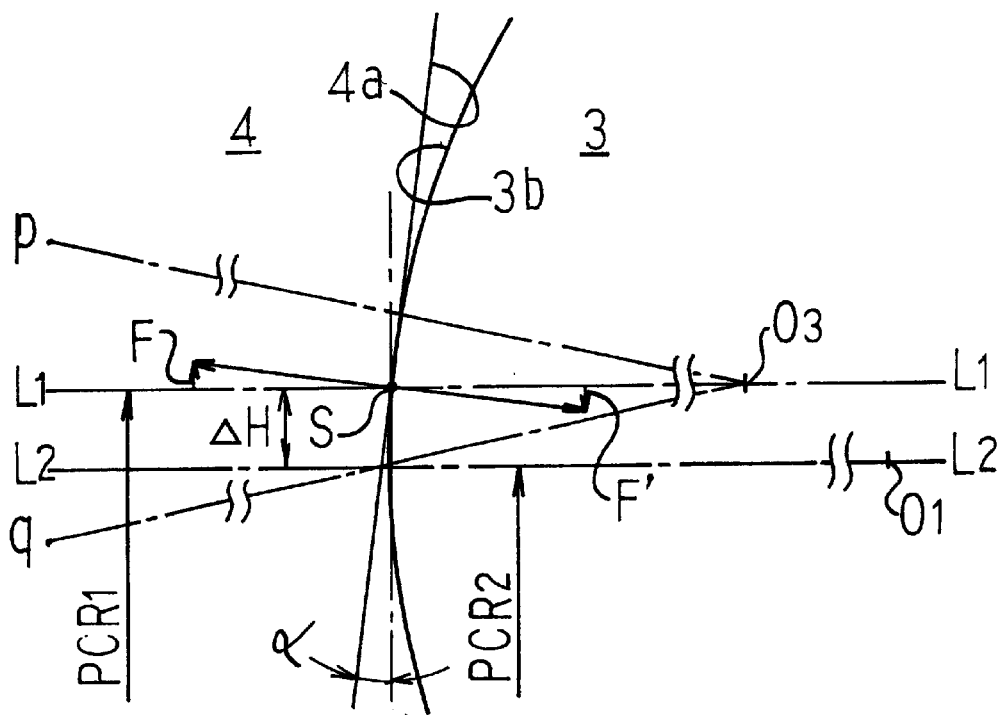
FIG. 3 is a schematic view showing an embodiment of the constant velocity universal joint with the inner circumference surface of an outer roller being in contact with the outer circumference surface of the inner roller.

First, a first embodiment of the present invention is to be explained with reference to FIGS. 1(a) through 3. Incidentally, FIGS. 1(a) and 3 show a joint at an operating angle of 0°.

Figure 1A:
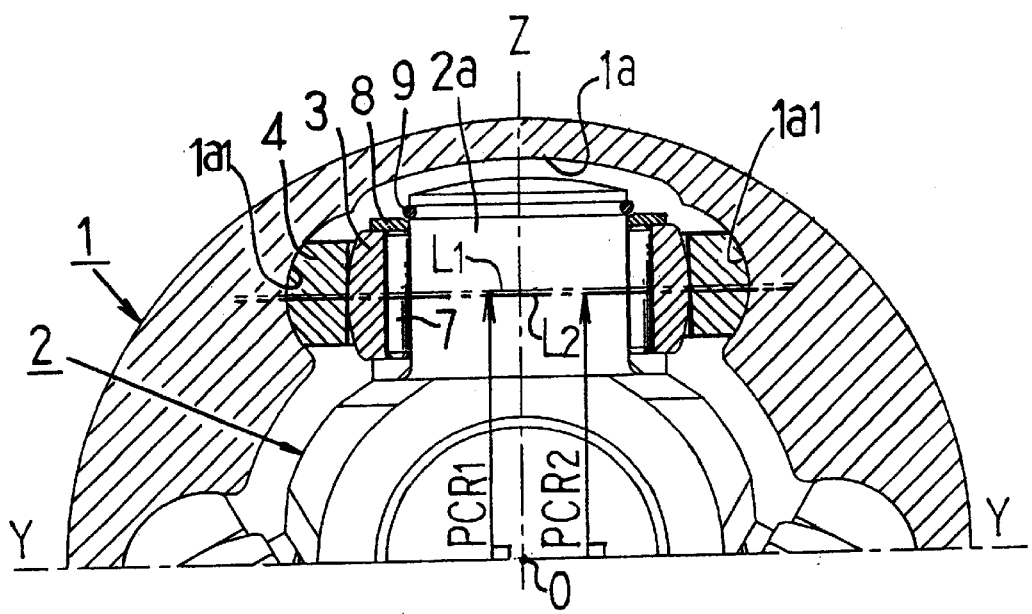
FIGS. 1(*a*) and 1(*b*) are cross sectional views of a constant velocity universal joint according to an embodiment of the present invention.

As shown in FIG. 1(a), the constant velocity universal joint of this embodiment comprises an outer joint member 1 to be connected to one of two shafts which are to be joined with each other and a tripod member 2 to be connected to the other shaft. The outer joint member 1 has a roughly cup-shaped contour, and three axially extending track grooves 1a are disposed equally spaced in the inner circumference of the member. A roller guideway 1a1 is provided on both sides of each of the track grooves 1a respectively. The tripod member 2 has three radially protruding trunnions 2a equally spaced on the outer circumference of the tripod member. An inner roller 3 rotatably engage the cylindrical outer circumference surface of each of the trunnions 2a via a plurality of needle rollers 7, and an outer roller 4 is disposed to rotatably engage the inner roller 3.

Figure 1B:
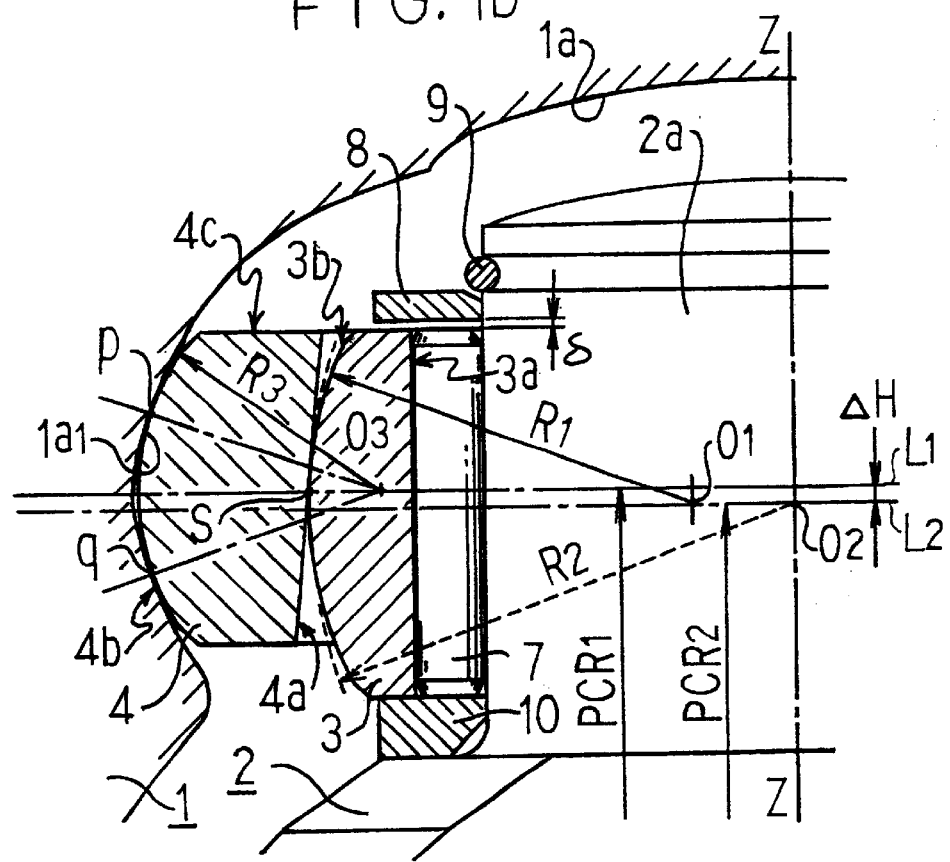
Figure 2:
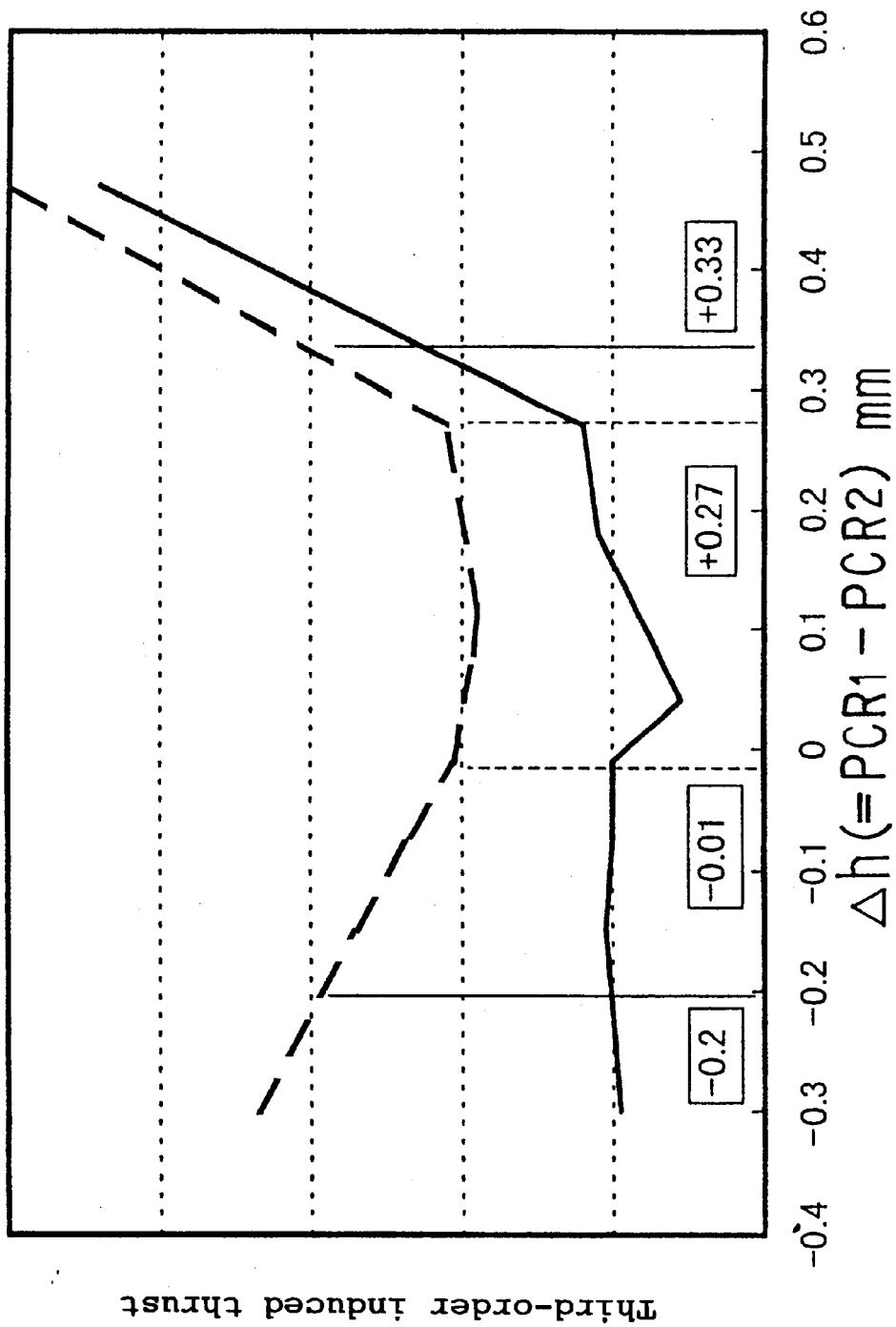
FIG. 2 is a graph showing the relationship between $\Delta h$ and the induced thrust.

As shown in FIG. 1(b) under magnification, the needle rollers 7 and the inner roller 3 engage at one end a retainer ring 8 and a snap ring 9 which are mounted at the distal end portion of the trunnion 2a and at the other end a washer 10 mounted on the proximal end portion of the trunnion 2a, thereby prohibiting the movement in the axis direction, Z, of the trunnions 2a. In practice, there is a slight axial clearance δ between the needle rollers 7 and the inner roller 3, and the retainer ring 8 and washer 10. In the drawing, the magnitude of the axial clearance δ is considerably exaggerated more than actually is. In addition, there are slight radial clearances between the outer circumference surface of the trunnion 2a and an inner circumference surface 3a of the inner roller 3, and the needle rollers 7. The inner circumference surface 3a of the inner roller 3 has a cylindrical surface and the outer circumference surface 3b has a spherically shaped convex surface. In this embodiment, the generating line of the outer circumference surface 3b is a circular arc of a radius of R1 with the center thereof at point O1 which is shifted by a predetermined amount outward from the radius center O2 of the inner roller 3. The radius R1 is smaller than the maximum radius R2 of the outer circumference surface 3b.

The outer roller 4 engages rotatably the outer circumference surface 3b of the inner roller 3. In this embodiment, an inner circumference surface 4a of the outer roller 4 has a conical shape whose diameter decreases gradually toward the distal end of the trunnion 2a, and is in line contact with the outer circumference surface 3b of the inner roller 3. This allows relative angular displacement between the outer roller 4 and inner roller 3 (the inclination mechanism). The angle of inclination α, shown in FIG. 3, of the inner circumference surface 4a is very small, for example, 0.1° to 3°, and is set so that α=0.3° to 0.7° in this embodiment. In the drawing, the inclination of the inner circumference surface 4a is considerably exaggerated. The generating line of the outer circumference surface 4b of the outer roller 4 is a circular arc of a radius of R3 with the center thereof at point O3 which is farther shifted outward than the point O1.

In this embodiment, the roller guideway 1a1 of the outer joint member 1 is double circular-arc shaped (gothic-arch shaped) in cross sectional shape. On this account, the roller guideway 1a1 and the outer circumference surface 4b of the outer roller 4 are in angular contact at points, p and q, with each other. The angular contact points p and q include the center O3 of the outer circumference surface 4b of the outer roller 4 and are located opposite to each other apart by an equal distance in the direction of axis Z with respect to centerline L1 which is orthogonal to the axis Z of the trunnion 2a. Incidentally, the cross sectional shape of the roller guideway 1a1 may take a form of V-shape or parabolic shape.

Figure 4:
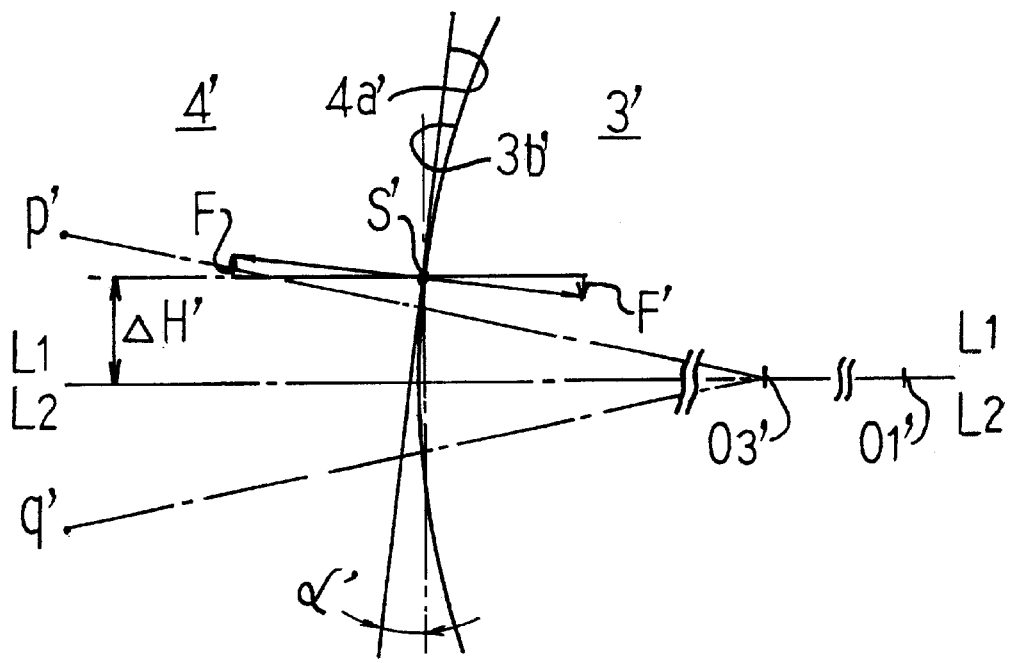
FIG. 4 is a schematic view showing the constant velocity universal joint shown in FIG. 5 with the inner circumference surface of an outer roller being in contact with the outer circumference surface of the inner roller.
Figure 6:
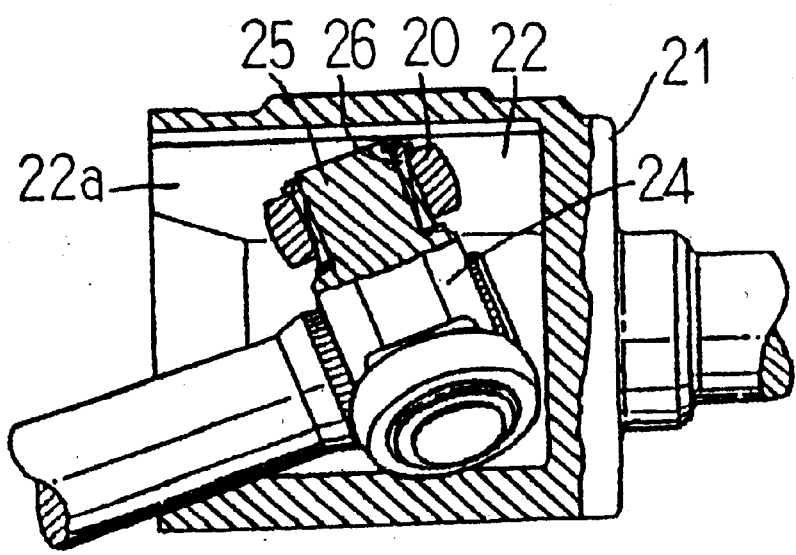
FIG. 6 is a longitudinal sectional view of another constant velocity universal joint according to a prior art.
Figure 7:
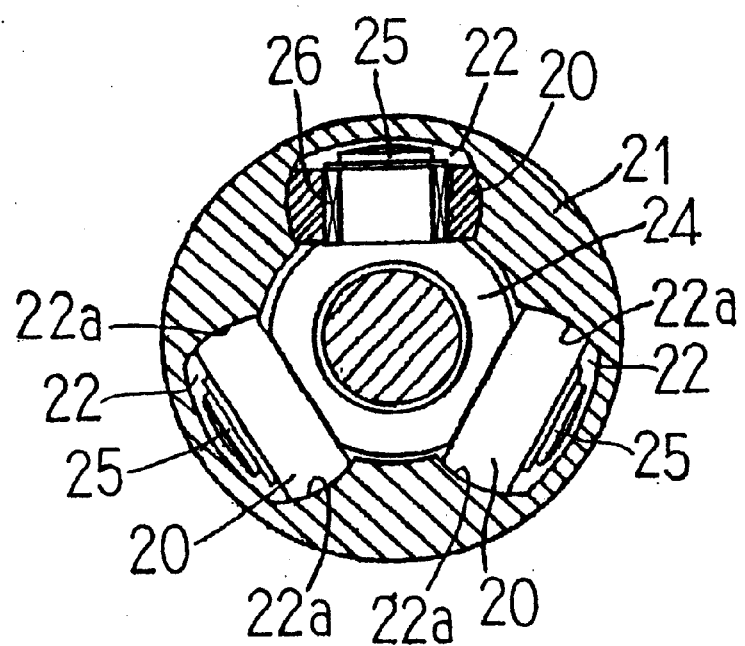
FIG. 7 is a cross sectional view of FIG. 6.
Figure 8:
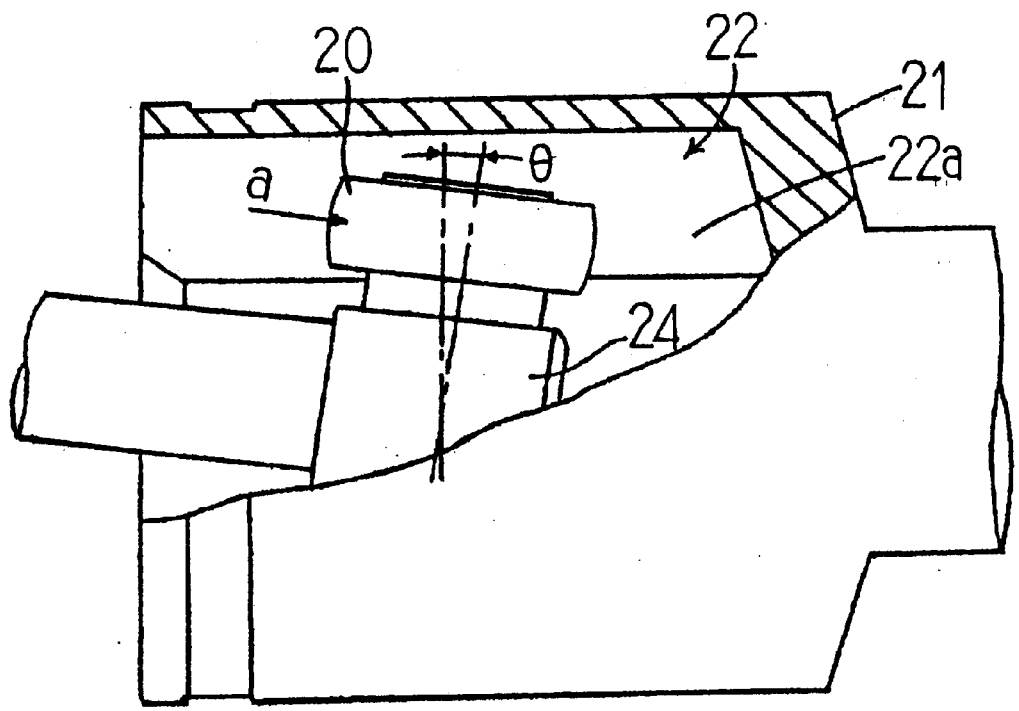
FIG. 8 is a longitudinal sectional view showing the prior art joint, shown in FIGS. 6 and 7, at an operating angle.
Figure 9:
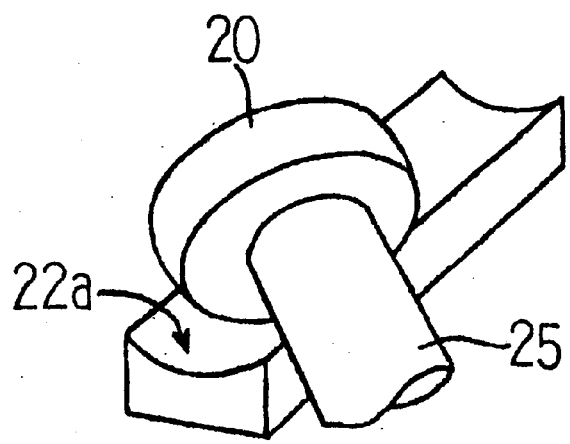
FIG. 9 is a perspective view showing the relationship between the roller and the roller guideway at an operating angle.
Figure 10:
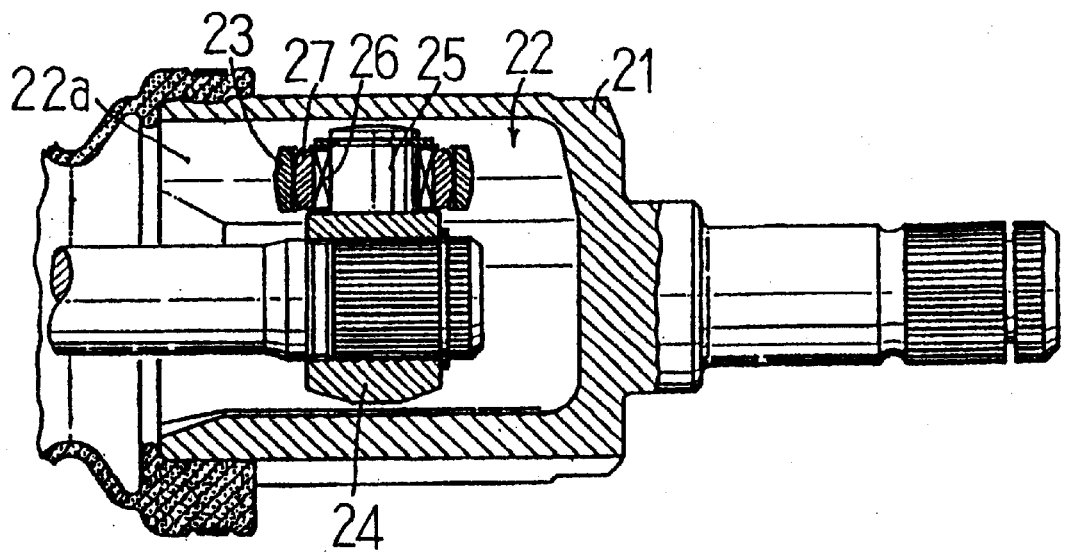
FIG. 10 is a longitudinal sectional view of another constant velocity universal joint according to a prior art.
Figure 11:
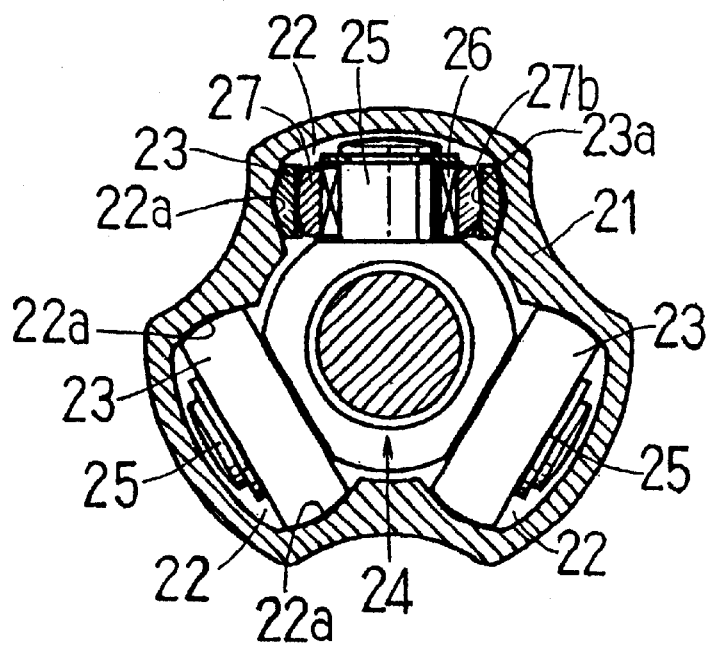
FIG. 11 is a cross sectional view of FIG. 10.
Figure 12:
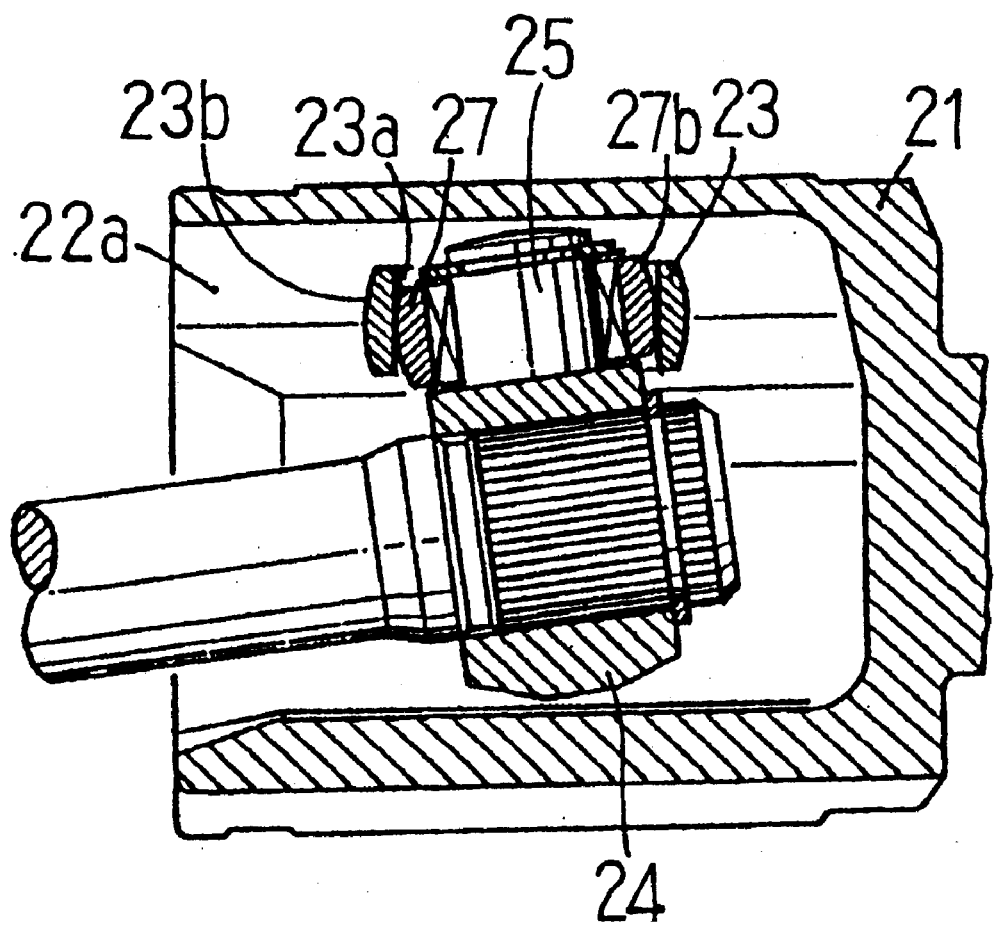
FIG. 12 is a longitudinal sectional view showing the prior art joint, shown in FIGS. 10 and 11, at an operating angle.

The perpendicular distance (PCR1) between the centerline L1 including the center O3 of the outer circumference surface 4b of the outer roller 4, orthogonal to the axis Z of the trunnion 2a and the joint center O, and the perpendicular distance (PCR2) between centerline L2 including the center O1 of the outer circumference surface 3b of the inner roller 3, orthogonal to the axis Z of the trunnion 2a and the joint center O are shifted by ΔH (=PCR1−PCR2). Under the most favorable condition shown in FIG. 1(b), PCR2 is shifted from PCR1 by an optimum amount of ΔH toward the proximal end of the trunnion (downward in the figure), and the contact position S of the inner circumference surface 4a of the outer roller 4 and the outer circumference surface 3b of the inner roller 3 is located on the centerline L1 (on PCR1) of the outer circumference surface 4b of the outer roller 4. The magnitude of the aforementioned ΔH corresponds to that of ΔH' shown in FIG. 4.

Since the inner circumference surface 4a of the outer roller 4 has a conical shape whose diameter gradually decreases toward the distal end of the trunnion, a loading component force F is generated toward the distal end of the trunnion at the position S in contact with the outer circumference surface 3b of the inner roller 3. In addition, as a reactive force against this loading component force F, force F' is generated toward the proximal end of the trunnion. Since the action of the loading component force F and the reactive force F' is the same as that in the configuration shown in FIG. 5, explanation is omitted to avoid the repetition.

A feature of this embodiment is that PCR2 of the outer circumference surface 3b of the inner roller 3 is shifted by a predetermined amount of ΔH toward the proximal end of the trunnion (downward in the figure) farther than PCR1 of the outer circumference surface 4b of the outer roller 4, whereby the contact position S between the inner circumference surface 4a of the outer roller 4 and the outer circumference surface 3b of the inner roller 3 is adapted to sit on PCR1. Such configuration allows for reducing the induced thrust more than ever compared with the configuration shown in FIG. 5. The reason for this may be conceived as follows. That is, when the joint transmits rotational torque taking an operating angle, accompanying a phase change in the rotation direction of the trunnion 2a, the contact position S is to move reciprocally within a predetermined region, from a reference point at which the operating angle is 0° (the position of PCR1 shown in FIG. 3 which divides the distance between angular contact points p and q into equal parts) toward the proximal end of the trunnion (downward in the figure) and toward the distal end of the trunnion (upward in the figure) (the amount of movement from the position of an operating angle of 0° toward the proximal end of the trunnion is greater than that toward the distal end of the trunnion), that is, a region adjacent to the angular contact point q. However, the effect caused by the movement of contact position S toward the angular point q cancels out the effect caused by the loading component F directing toward the distal end of the trunnion. This allows for maintaining a balance in loading between angular contact points p and q and thus limiting the inclination of the outer roller 4 (drift).

As in the foregoing, allowing the contact position S at an operating angle of 0° to sit on PCR1 of the outer circumference surface 4b of the outer roller 4 enables the induced thrust to be reduced more than ever. However, manufacturing errors are unavoidable in dimensions and shapes of respective parts and it is thus impossible to obtain the aforementioned optimum configuration for all actual products. Moreover, the contact position S cannot be precisely known in assembled joints. Accordingly, before assembly, PCR1 of the outer circumference surface 4b of the outer roller 4 and PCR2 of the outer circumference surface 3b of the inner roller 3 are to be measured and a mutual difference $\Delta h$ (=PCR1−PCR2) is to be controlled in order to predict the post-assembly contact position S ($\Delta H$). Incidentally, errors in dimensions and shapes of the roller guideway 1a1 of the outer joint member 1 and the outer circumference surface 4b of the outer roller 4 and the like are 6 considered as the factor of variance in PCR1. In addition, errors in dimensions and shapes of the outer circumference surface 3b of the inner roller 3 and an error in dimensions from the end surface of the trunnion 2a to the joint center O and the like are considered as a factor of variance in PCR2.

Controlling the aforementioned mutual difference $\Delta h$ (=PCR1−PCR2) in an accurate manner (for example, at a predetermined value) enables actual products to come as close to the aforementioned most favorable configuration as possible. On the other hand, controlling the mutual difference $\Delta h$ in a highly accurate manner leads to an increased percentage of defective parts or the necessity of processing parts with high accuracy, resulting in increased manufacturing cost. Therefore, taking the tradeoff between the reduction in the induced thrust and the manufacturing cost into consideration, the mutual difference $\Delta h$ may be preferably controlled with an optimum range of control. An experiment was performed in order to determine this optimum range of control for the mutual difference $\Delta h$. With the constant velocity universal joint having the configuration (the angle of inclination $\alpha=0.3°$ to 0.7°) shown in FIG. 1, the experiment was carried out by manufacturing various sample joints having different mutual difference $\Delta h$, by rotating each sample joint at a predetermined operating angle, rotational torque, and rpm, and then by measuring the induced thrust. The results are summarized and shown in FIG. 2. Incidentally, in FIG. 2, the upper dotted line shows a plot of maximum values of the induced thrust (third-order component), while the lower solid line shows a plot of minimum values of the induced thrust (third-order component). As shown in the figure, the effect of reduction in the induced thrust is recognized within a range of −0.2 mm$\leq\Delta h\leq$0.33 mm and particularly within a range of −0.1 mm$\leq\Delta h\leq$0.3 mm, and more particularly, a remarkable effect of reduction in the induced thrust is recognized within a range of −0.01 mm$\leq\Delta h\leq$0.27 mm. Therefore, setting the value of control of $\Delta h$ to the aforementioned range enables actual products to achieve the target value of the induced thrust and to obtain improved low vibration dynamic characteristics as well as to make the manufacturing cost economical.

Incidentally, in order to reduce the number of parts used, the washer 10 of FIG. 1 may be eliminated. Moreover, the joint may be configured such that the other ends of the inner roller 3 and the needle roller 7 are in contact with the shoulder of the proximal end portion of the trunnion 2a.

Figure 13:
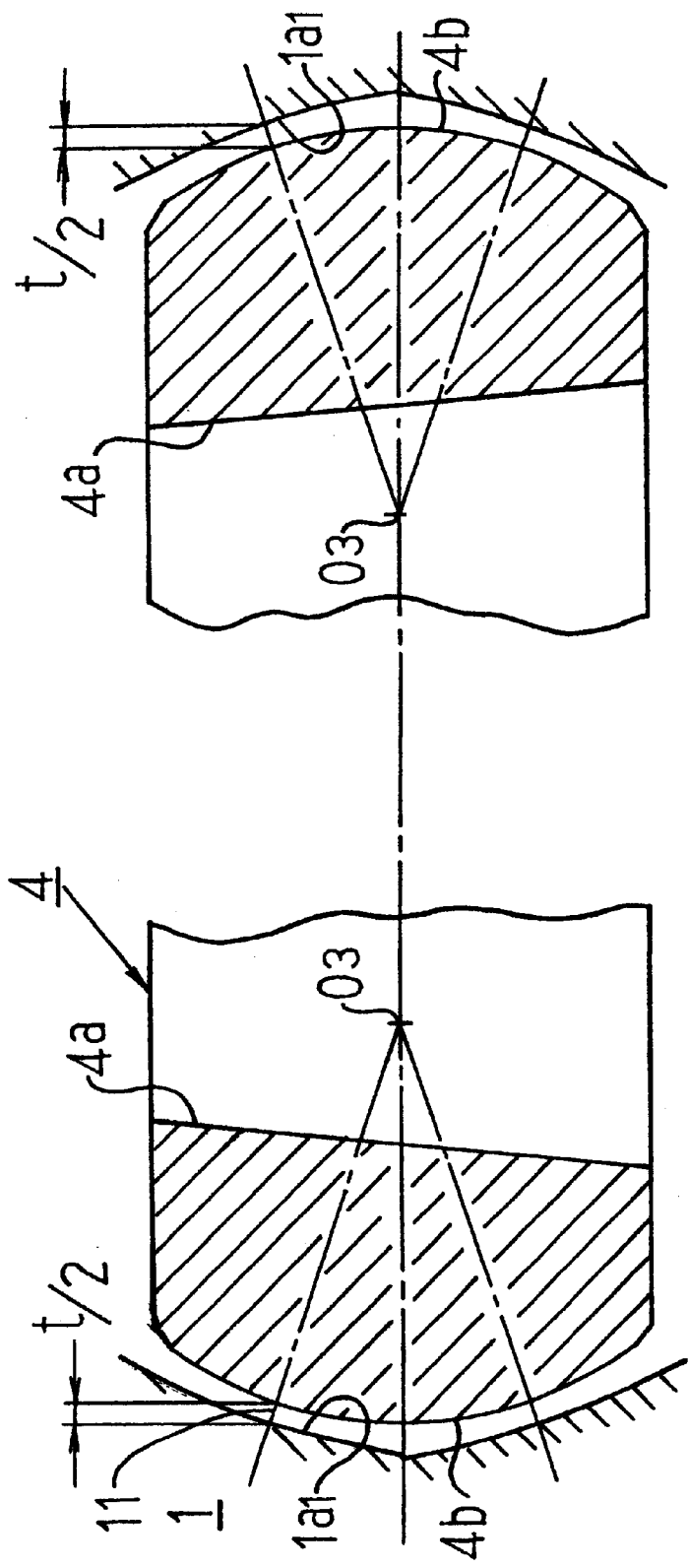
FIG. 13 is an enlarged cross sectional view showing the main portion of the guideway clearance between the roller guideway and the outer circumference surface of the outer roller.

As shown in FIG. 13, in the constant velocity universal joint shown in FIG. 1, there is provided a guideway clearance 11 between the roller guideway 1a1 and the outer circumference surface 4b of the outer roller 4. The magnitude of the guideway clearance 11 is t. The magnitude, t, of the guideway clearance 11 is set optimally from the viewpoint of reducing the induced thrust. Incidentally, in the figure, the outer roller 4 is located at the center of the roller guideways 1a1 disposed on the both sides and t/2, a half of the guideway clearance 11, is given to both sides of outer circumference surface 4b respectively. However, when torque is transmitted, the outer circumference surface 4b is in contact with the roller guideway 1a1 on the loading side. Thus, the guideway clearance 11 of a magnitude of t is created between the roller guideway 1a1 on the non-loading side and the outer circumference surface 4b (in the case of absence of the inclination of the outer roller 4).

A feature of a second embodiment of the present invention is that PCR2 of the outer circumference surface 3b of the inner roller 3 is shifted by a predetermined amount of $\Delta H$ toward the proximal end of the trunnion farther than PCR1 of the outer circumference surface 4b of the outer roller 4, whereby the contact position S between the inner circumference surface 4a of the outer roller 4 and the outer circumference surface 3b of the inner roller 3 is adapted to sit on PCR1. In addition, another feature is that the magnitude, t, of the guideway clearance 11 between the roller guideway 1a1 and the outer circumference surface 4b of the outer roller 4 is set optimally to a value at which the induced thrust can be efficiently reduced. Such configuration allows for reducing the induced thrust more than ever compared with the configuration shown in FIG. 5. The reason for this may be conceived as follows.

That is, when the joint transmits rotational torque at an operating angle, accompanying a phase change in the rotation direction of the trunnion 2a, the contact position S is to move reciprocally within a predetermined region, from a reference point at which the operating angle is 0° (the position of PCR1 shown in FIG. 3 which divides the distance between angular contact points p and q into equal parts) toward the proximal end of the trunnion (downward in the figure) and toward the distal end of the trunnion (upward in the figure) (the amount of movement from the position of an operating angle of 0° toward the proximal end of the trunnion is greater than that toward the distal end of the trunnion), that is, a region adjacent to the angular contact point q. However, the effect caused by the movement of contact position S toward the angular point q cancels out the effect caused by the loading component F directing toward the distal end of the trunnion. This allows for maintaining a balance in loading between angular contact points p and q and thus limiting the inclination of the outer roller 4 (drift). Moreover, since the magnitude t of the guideway clearance 11 is set optimally, even in the presence of an inclination of the outer roller 4, the roller guideway 1a1 on the non-loading side slightly contacts to an appropriate extent with the outer circumference surface 4b to suppress further inclination of the outer roller 4, and additionally an increase in contact surface pressure at that time is suppressed to a minimum. Excessively small guideway clearance 11 causes the roller guideway 1a1 on the non-loading side to contact comparatively firmly with the outer circumference surface 4b in response to a slight inclination of the outer roller 4, thus leading to an increase in the contact surface pressure. Conversely, excessively large guideway clearance 11 causes the degree of freedom to grow larger in response to the inclination of the outer roller 4, resulting in accelerating angular contact between the outer roller 4 and the roller guideway 1a1. As such, the induced thrust is considered to be further reduced by the suppressing effect of the inclination of the outer roller 4 through an optimal setting of the contact position S in conjunction with the suppressing effects of the inclination of and contact surface pressure of the outer roller 4 through an optimal setting of the guideway clearance 11.

Like the first embodiment, before assembly, PCR1 of the outer circumference surface 4b of the outer roller 4 and PCR2 of the outer circumference surface 3b of the inner roller 3 are to be measured and a mutual difference $\Delta h$ (=PCR1−PCR2) is to be controlled in order to predict the post-assembly contact position S ($\Delta H$). Like the first embodiment, the mutual difference $\Delta h$ (=PCR1−PCR2) may be set to a range of −0.2 mm$\leq \Delta h \leq$0.33 mm, preferably to a range of −0.1 mm$\leq \Delta h \leq$0.3 mm, and more preferably to a range of −0.1 mm$\leq \Delta h \leq$0.27 mm. In this embodiment, a further narrowed width of control of $\Delta h$ is employed so that −0.05 mm$\leq \Delta h \leq$0.15 mm.

An experiment was performed in order to determine the optimum range of the magnitude, t, of the guideway clearance 11. With the constant velocity universal joint having the configuration (the angle of inclination $\alpha$=0.5°) shown in FIG. 1 and with PCR mutual difference $\Delta h$ equal to 71 $\mu$m, the experiment was carried out by manufacturing various sample joints having different magnitudes of t of the guideway clearance 11, by providing each of sample joints with an operating angle $\theta$=6°, 8°, 10°, and 12.5°, by rotating each sample at predetermined rotational torque and rpm, and then by measuring the induced thrust. The results are summarized and shown in FIG. 14.

From the result shown in FIG. 14, it was confirmed that, at any one of operating angles $\theta$=6°, 8°, 10°, and 12.5° given, the induced thrust is reduced within the range of 0.08 mm$\leq t \leq$0.110 mm. A car has usually the maximum operating angle on the order of 9°, however, the angle may take a maximum value on the order of 12° at the time of start of the car due to the shift of the weight. Therefore, within such a service operating angle region, the optimum value of the magnitude of the guideway clearance can be judged to be 0.08 mm$\leq t \leq$0.110 mm.

Incidentally, the present invention relating to optimal setting of the magnitude of the guideway clearance can also be applied to constant velocity universal joints having configurations shown in FIGS. 6 through 12. Furthermore, it can also be applied to a constant velocity universal joint which is so configured as to guide the end surface of the distal end of the trunnion of a roller by the shoulder surface of the roller guideway. That is, the present invention relating to optimal setting of the magnitude of the guideway clearance is broadly applicable to a constant velocity universal joint of a configuration which allows the roller guideway of a track groove to guide the outer circumference surface of a roller mounted to the trunnion. Accordingly, the configuration, shape, and guiding embodiment of the roller, and mounting embodiment of trunnions are not limited to those exemplified herein.

What is claimed is:

1. A constant velocity universal joint comprising an outer joint member having three axial track grooves formed in an inner portion thereof and having respective axial roller guideways on both sides of each of the track grooves, and a tripod member having three radially protruding trunnions to each of which an inner roller and an outer roller are mounted rotatably, said outer roller having a spherical outer circumference surface to be guided by the roller guideway of the track groove and an inner circumference surface, said inner roller having a spherical outer circumference surface in line contact with the inner circumference surface of the outer roller, and said inner circumference surface of the outer roller so shaped as to generate a loading component force toward a distal end of the trunnion at a position in contact with the outer circumference surface of the inner roller, wherein said position of contact at an operating angle of 0° is adapted to be located on a centerline including the center of the outer circumference surface of said outer roller and being orthogonal to an axis of said trunnion and wherein a difference $\Delta h$(=PCR1−PCR2) between a first perpendicular distance (PCR1) and a second perpendicular distance (PCR2) at the operating angle of 0° is formed, the first perpendicular distance (PCR1) being defined between said centerline which includes the center of the outer circumference surface of said outer roller and is orthogonal to an axis of said trunnion and the joint center, the second perpendicular distance (PCR2) being defined between a centerline which includes the center of the outer circumference surface of said inner roller and is orthogonal to the axis of said trunnion and the joint center.

2. The constant velocity universal joint according to claim 1, wherein the inner circumference surface of said outer roller has a conical shape whose diameter gradually decreases toward the distal end of the trunnion.

3. The constant velocity universal joint according to claim 1, wherein the outer circumference surface of said outer roller is in angular contact with the roller guideway at two points.

4. A constant velocity universal joint comprising an outer joint member having three axial track grooves formed in an inner portion thereof and having respective axial roller guideways on both sides of each of the track grooves, and a tripod member having three radially protruding trunnions to each of which an inner roller and an outer roller are mounted rotatably, said outer roller having a spherical outer circumference surface to be guided by the roller guideway of the track groove and an inner circumference surface, said inner roller having a spherical outer circumference surface in line contact with the inner circumference surface of the outer roller, and said inner circumference surface of the outer roller so shaped as to generate a loading component force toward a distal end of the trunnion at a position in contact with the outer circumference surface of the inner roller, wherein a difference $\Delta h$ (=PCR1−PCR2) between a perpendicular distance (PCR1) and a perpendicular distance (PCR2) at an operating angle of 0° is secured to be within a range of $-0.2 \text{ mm} \leq \Delta h \leq 0.33 \text{ mm}$, the perpendicular distance (PCR1) being defined between a centerline which includes the center of the outer circumference surface of said outer roller and is orthogonal to an axis of said trunnion and the joint center, the perpendicular distance (PCR2) being defined between a centerline which includes the center of the outer circumference surface of said inner roller and is orthogonal to the axis of said trunnion and the joint center.

5. The constant velocity universal joint according to claim 4, wherein the inner circumference surface of said outer roller has a conical shape whose diameter gradually decreases toward the distal end of the trunnion.

6. The constant velocity universal joint according to claim 4, wherein the outer circumference surface of said outer roller is in angular contact with the roller guideway at two points.

7. A constant velocity universal joint comprising
an outer joint member having three axial track grooves formed in an inner portion thereof and having respective axial roller guideways on both sides of each of the track grooves, and a tripod member having three radially protruding trunnions to each of which a roller is mounted rotatably, said roller having an outer circumference surface to be guided by the roller guideway of the track groove, wherein a guideway clearance between the roller guideway on the both sides of said track groove and the outer circumference surface of said roller is secured to a predetermined amount sufficient to reduce induced thrust and wherein a magnitude t, of said guideway clearance lies within a range of $0.080 \text{ mm} \leq t \leq 0.110 \text{ mm}$.

8. The constant velocity universal joint according to claim 7, wherein said roller comprises
an outer roller with an outer circumference surface to be guided by the roller guideway of the track groove and an inner roller with a spherical outer circumference surface in line contact with the inner circumference surface of the outer roller.

9. The constant velocity universal joint according to claim 8, wherein the inner circumference surface of said outer roller is so shaped as to generate a loading component force toward a distal end of the trunnion at a position in contact with the outer circumference surface of the inner roller.

10. The constant velocity universal joint according to claim 9, wherein the inner circumference surface of said outer roller has a conical shape whose diameter gradually decreases toward the distal end of the trunnion.

11. The constant velocity universal joint according to claim 7, 8, 9, or 10, wherein the outer circumference surface of said roller is in angular contact with the roller guideway at two points.

12. The constant velocity universal joint according to claim 8, 9, or 10, wherein a difference $\Delta h$ (=PCR1−PCR2) between a perpendicular distance (PCR1) and a perpendicular distance (PCR2) at an operating angle of 0° is secured to be within a range of $-0.2 \text{ mm} \leq \Delta h \leq 0.33 \text{ mm}$, the perpendicular distance (PCR1) being defined between a centerline which includes the center of the outer circumference surface of said outer roller and is orthogonal to an axis of said trunnion and the joint center, the perpendicular distance (PCR2) being defined between a centerline which includes the center of the outer circumference surface of said inner roller and is orthogonal to the axis of said trunnion and the joint center.

13. The constant velocity universal joint according to claim 11, wherein a difference $\Delta h$ (=PCR1−PCR2) between a perpendicular distance (PCR1) and a perpendicular distance (PCR2) at an operating angle of 0° is secured to be within a range of $-0.2 \text{ mm} \leq \Delta h \leq 0.33 \text{ mm}$, the perpendicular distance (PCR1) being defined between a centerline which includes the center of the outer circumference surface of said outer roller and is orthogonal to an axis of said trunnion and the joint center, the perpendicular distance (PCR2) being defined between a centerline which includes the center of the outer circumference surface of said inner roller and is orthogonal to the axis of said trunnion and the joint center.

14. The constant velocity universal joint according to claim 7, wherein a difference $\Delta h$ (=PCR1−PCR2) between a perpendicular distance (PCR1) and a perpendicular distance (PCR2) at an operating angle of 0° is secured to be within a range of $-0.2 \text{ mm} \leq \Delta h \leq 0.33 \text{ mm}$, the perpendicular distance (PCR1) being defined between a centerline which includes the center of the outer circumference surface of said outer roller and is orthogonal to an axis of said trunnion and the joint center, the perpendicular distance (PCR2) being defined between a centerline which includes the center of the outer circumference surface of said inner roller and is orthogonal to the axis of said trunnion and the joint center.

15. The constant velocity universal joint according to claim 7, wherein a difference $\Delta h$ (=PCR1−PCR2) between a perpendicular distance (PCR1) and a perpendicular distance (PCR2) at an operating angle of 0° is secured to be within a range of $-0.2 \text{ mm} \leq \Delta h \leq 0.33 \text{ mm}$, the perpendicular distance (PCR1) being defined between a centerline which includes the center of the outer circumference surface of said outer roller and is orthogonal to an axis of said trunnion and the joint center, the perpendicular distance (PCR2) being defined between a centerline which includes the center of the outer circumference surface of said inner roller and is orthogonal to the axis of said trunnion and the joint center.

16. A constant velocity universal joint comprising
an outer joint member having three axial track grooves formed in an inner portion thereof and having respective axial roller guideways on both sides of each of the track grooves, and a tripod member having three radially protruding trunnions to each of which an inner roller and an outer roller are mounted rotatably, said outer roller having a spherical outer circumference surface to be guided by the roller guideway of the track groove and an inner circumference surface, said inner roller having a spherical outer circumference surface in line contact with the inner circumference surface of the outer roller, and said inner circumference surface of the outer roller so shaped as to generate a loading component force toward a distal end of the trunnion at a position in contact with the outer circumference surface of the inner roller, wherein said position of contact at an operating angle of 0° is adapted to be located on a centerline including the center of the outer circumference surface of said outer roller and being orthogonal to an axis of said trunnion and wherein a difference $\Delta h(=PCR1-PCR2)$ between a first perpendicular distance (PCR1) and a second perpendicular distance (PCR2) at the operating angle of 0° is formed, the first perpendicular distance (PCR1) being defined between said centerline which includes the center of the outer circumference surface of said outer roller and is orthogonal to an axis of said trunnion and the joint center, the second perpendicular distance (PCR2) being defined between a centerline which includes the center of the outer circumference surface of said inner roller and is orthogonal to the axis of said trunnion and the joint center, and wherein a guideway clearance between the roller guideway on both sides of said track groove and the outer circumference surface of at least one of said inner roller and said outer roller is secured to a predetermined amount sufficient to reduce induced thrust.

17. A constant velocity universal joint comprising an outer joint member having three axial track grooves formed in an inner portion thereof and having respective axial roller guideways on both sides of each of the track grooves, and a tripod member having three radially protruding trunnions to each of which a roller is mounted rotatably, said roller having an outer circumference surface to be guided by the roller guideway of the track groove, wherein a guideway clearance between the roller guideway on the both sides of said track groove and the outer circumference surface of said roller is secured to a predetermined amount sufficient to reduce induced thrust, wherein the outer circumference surface of said roller is in angular contact with the roller guideway at two points and a magnitude, t, of said guideway clearance lies within a range of $0.080 \text{ mm} \leq t \leq 0.110 \text{ mm}$.

18. A constant velocity universal joint comprising an outer joint member having three axial track grooves formed in an inner portion thereof and having respective axial roller guideways on both sides of each of the track grooves, and a tripod member having three radially protruding trunnions to each of which a roller is mounted rotatably, said roller having an outer circumference surface to be guided by the roller guideway of the track groove, wherein a guideway clearance between the roller guideway on the both sides of said track groove and the outer circumference surface of said roller is secured to a predetermined amount sufficient to reduce induced thrust, wherein said roller comprises an outer roller with an outer circumference surface to be guided by the roller guideway of the track groove and an inner roller with a spherical outer circumference surface in line contact with the inner circumference surface of the outer roller and, wherein a difference $\Delta h$ $(=PCR1-PCR2)$ between a perpendicular distance (PCR1) and a perpendicular distance (PCR2) at an operating angle of 0° is secured to be within a range of $-0.2 \text{ mm} \leq \Delta h \leq 0.33$ mm, the perpendicular distance (PCR1) being defined between a centerline which includes the center of the outer circumference of said outer roller and is orthogonal to an axis of said trunnion and the joint center, the perpendicular distance (PCR2) being defined between a centerline which includes the center of the outer circumference surface of said inner roller and is orthogonal to the axis of said trunnion and the joint center.

19. A constant velocity universal joint comprising an outer joint member having three axial track grooves formed in an inner portion thereof and having respective axial roller guideways on both sides of each of the track grooves, and a tripod member having three radially protruding trunnions to each of which a roller is mounted rotatably, said roller having an outer circumference surface to be guided by the roller guideway of the track groove, wherein a guideway clearance between the roller guideway on the both sides of said track groove and the outer circumference surface of said roller is secured to a predetermined amount sufficient to reduce induced thrust, wherein the outer circumference surface of said roller is in angular contact with the roller guideway at two points and wherein a difference $\Delta h$ $(=PCR1-PCR2)$ between a perpendicular distance (PCR1) and a perpendicular distance (PCR2) at an operating angle of 0° is secured to be within a range of $-0.2 \text{ mm} \leq \Delta h \leq 0.33$ mm, the perpendicular distance (PCR1) being defined between a centerline which includes the center of the outer circumference of said outer roller and is orthogonal to an axis of said trunnion and the joint center, the perpendicular distance (PCR2) being defined between a centerline which includes the center of the outer circumference surface of said inner roller and is orthogonal to the axis of said trunnion and the joint center.

20. A constant velocity universal joint comprising an outer joint member having three axial track grooves formed in an inner portion thereof and having respective axial roller guideways on both sides of each of the track grooves, and a tripod member having three radially protruding trunnions to each of which a roller is mounted rotatably, said roller having an outer circumference surface to be guided by the roller guideway of the track groove, wherein a guideway clearance between the roller guideway on the both sides of said track groove and the outer circumference surface of said roller is secured to a predetermined amount sufficient to reduce induced thrust, wherein a magnitude, t, of said guideway clearance lies within a range of $0.080 \text{ mm} \leq t \leq 0.110 \text{ mm}$ and wherein a difference $\Delta h$ $(=PCR1-PCR2)$ between a perpendicular distance (PCR1) and a perpendicular distance (PCR2) at an operating angle of 0° is secured to be within a range of $-0.2 \text{ mm} \leq \Delta h \leq 0.33$ mm, the perpendicular distance (PCR1) being defined between a centerline which includes the center of the outer circumference of said outer roller and is orthogonal to an axis of said trunnion and the joint center, the perpendicular distance (PCR2) being defined between a centerline which includes the center of the outer circumference surface of said inner roller and is orthogonal to the axis of said trunnion and the joint center.

21. A constant velocity universal joint comprising an outer joint member having three axial track grooves formed in an inner portion thereof and having respective axial roller guideways on both sides of each of the track grooves, and a tripod member having three radially protruding trunnions to each of which a roller is mounted rotatably, said roller having an outer circumference surface to be guided by the roller guideway of the track groove, wherein a guideway clearance between the roller guideway on the both sides of said track groove and the outer circumference surface of said roller is secured to a predetermined amount sufficient to reduce induced thrust, wherein the outer circumference surface of said roller is in angular contact with the roller guideway at two points, wherein a magnitude, t, of said guideway clearance lies within a range of $0.080$ mm $\leq t \leq 0.110$ mm and wherein a difference $\Delta h$ (=PCR1−PCR2) between a perpendicular distance (PCR1) and a perpendicular distance (PCR2) at an operating angle of $0°$ is secured to be within a range of $-0.2$ mm $\leq \Delta h \leq 0.33$ mm, the perpendicular distance (PCR1) being defined between a centerline which includes the center of the outer circumference of said outer roller and is orthogonal to an axis of said trunnion and the joint center, the perpendicular distance (PCR2) being defined between a centerline which includes the center of the outer circumference surface of said inner roller and is orthogonal to the axis of said trunnion and the joint center.

* * * * *